US006622312B2

(12) United States Patent
Rabinowicz (10) Patent No.: US 6,622,312 B2
(45) Date of Patent: Sep. 23, 2003

(54) GARMENT ASSEMBLED WITHOUT SEWING

(75) Inventor: Sigi Rabinowicz, Beni-Brak (IL)

(73) Assignee: Alba-Waldensian, Inc., Valdese, NC (US)

( * ) Notice: Subject to any disclaimer, the term of this patent is extended or adjusted under 35 U.S.C. 154(b) by 0 days.

(21) Appl. No.: 10/141,015

(22) Filed: May 8, 2002

(65) Prior Publication Data
US 2002/0129434 A1 Sep. 19, 2002

Related U.S. Application Data (63) Continuation of application No. 09/679,157, filed on Oct. 5, 2000.

(51) Int. Cl.[7] .............................................. A41D 27/00
(52) U.S. Cl. ............................................... 2/401; 2/274
(58) Field of Search ............................ 2/275, 274, 244, 2/220, 221, 222, 401; 66/175, 176, 177, 171

(56) References Cited

U.S. PATENT DOCUMENTS

| 3,168,749 A | * | 2/1965 | Cala ............................... 2/269 |
| 4,090,897 A | | 5/1978 | Minick |
| 4,313,778 A | | 2/1982 | Mims |
| 4,355,425 A | | 10/1982 | Jones et al. |
| 4,527,403 A | | 7/1985 | Fullbright et al. |
| 4,624,115 A | | 11/1986 | Safrit et al. |
| 4,630,320 A | | 12/1986 | Van Gompel |
| 4,645,629 A | | 2/1987 | Stern |
| 4,682,479 A | | 7/1987 | Pernick |
| 5,081,854 A | | 1/1992 | Lonati |
| 5,131,100 A | | 7/1992 | Atwater et al. |
| 5,464,488 A | | 11/1995 | Servin |
| 5,586,339 A | * | 12/1996 | Lathan ............................ 2/46 |
| 5,590,548 A | | 1/1997 | Osborne |
| 5,592,836 A | | 1/1997 | Schuster et al. |
| 5,601,547 A | | 2/1997 | Kato et al. |
| 5,611,722 A | | 3/1997 | Osborne |
| 5,669,996 A | | 9/1997 | Jessup |
| 5,746,068 A | | 5/1998 | Popa et al. |
| 5,820,443 A | * | 10/1998 | Burr ............................ 450/40 |
| 5,836,179 A | | 11/1998 | van Laar |
| 5,870,778 A | | 2/1999 | Tharpe |
| 5,940,887 A | | 8/1999 | Rajala et al. |
| 6,029,274 A | | 2/2000 | Welchel et al. |
| 6,041,446 A | | 3/2000 | Braunstein et al. |

(List continued on next page.)

FOREIGN PATENT DOCUMENTS

| EP | 1 033 084 A2 | 9/2002 |
| FR | 2 255 023 | 7/1975 |

Primary Examiner—John J. Calvert
Assistant Examiner—Alissa L Hoey
(74) Attorney, Agent, or Firm—Alston & Bird LLP (57) ABSTRACT

Elastic and/or decorative trim is attached along an edge of a fabric body of a garment without sewing. The trim comprises a textile material containing fibers of thermoplastic material. The fabric edge to which the trim is attached can be any type of fabric, not necessarily containing any thermoplastic fibers. The trim is attached by wrapping the trim around the fabric edge so that the edge is sandwiched between two opposing portions of the trim, and then localized regions of the trim are heated, preferably ultrasonically, to cause the thermoplastic material in the trim to become plastic and flow together from the opposing portions, thus penetrating through the fabric edge. The thermoplastic material is then allowed to cool and solidify, thereby attaching the trim to the fabric edge. Also disclosed are garments having ultrasonically formed joints between two or more fabric panels. Particular joints are described enabling non-ultrasonically bondable panels to be ultrasonically joined to other ultrasonically bondable panels.

8 Claims, 3 Drawing Sheets

U.S. PATENT DOCUMENTS

| | | |
|---|---|---|
| 6,098,203 A | 8/2000 | Rajala et al. |
| 6,115,847 A | 9/2000 | Rosch et al. |
| 6,120,489 A | 9/2000 | Johnson et al. |
| 6,125,664 A | 10/2000 | Browder, Jr. |
| 6,192,521 B1 | 2/2001 | Alberts et al. |
| 6,192,717 B1 | 2/2001 | Rabinowicz |
| 6,276,175 B1 * | 8/2001 | Browder, Jr. ................ 66/171 |
| 6,286,144 B1 * | 9/2001 | Henderson et al. ............... 2/69 |
| 6,517,651 B2 * | 2/2003 | Azulay ...................... 156/73.1 |

* cited by examiner fig.1.

GARMENT ASSEMBLED WITHOUT SEWING

CROSS-REFERENCE TO RELATED APPLICATION

This application is a continuation of U.S. patent application Ser. No. 09/679,159 filed Oct. 5, 2000, currently pending.

FIELD OF THE INVENTION

The present invention relates to garments and, more particularly, to garments assembled without sewing.

BACKGROUND OF THE INVENTION

Garments have traditionally been produced by a cut-and-sew technique in which a plurality of separate fabric pieces are joined together, typically by sewing with thread, to form the finished garment. The drawbacks of this method of production are well known, and thus efforts have been made to devise alternative methods of production that can reduce or eliminate the amount of sewing required for assembling a garment. Major strides in this direction have been made, at least for certain types of garments, by applying circular knitting techniques to produce the main tubular body of the garment without seams. In general, however, it is still necessary to finish the garment by sewing, such as for applying decorative or elastic trim or banding around leg openings, neck openings, arm openings, waist openings, or the like, and for joining different portions of the garment that cannot be integrally knit together during the circular knitting process. For example, a so-called "seamless" panty still requires at least one seam, typically located in a crotch region of the panty, for joining together a front panel and a back panel of the tubular fabric blank from which the panty is made.

The formation of such seams and the attachment of elements such as elastic are to this day still performed by sewing with thread in the commercial production of most garments. This generally requires the manufacturer to keep an extensive inventory of dye-to-match sewing thread so that the thread will be the same color as the fabric of the garment. It would be desirable to eliminate the requirement of sewing with thread to assemble and finish a garment.

SUMMARY OF THE INVENTION

The present invention enables many types of garments to be assembled and finished without sewing with thread. In accordance with a first aspect of the invention, a trim is attached along an edge of a fabric body of a garment without sewing. The trim comprises a textile material containing fibers of thermoplastic material. The fabric edge to which the trim is attached can be any type of fabric, not necessarily containing any thermoplastic fibers. For example, the fabric can be all cotton or other natural fibers. The trim is attached by wrapping the trim around the fabric edge so that the edge is sandwiched between two opposing portions of the trim, and then localized regions of the trim are heated to cause the thermoplastic material in the trim to become plastic and flow together from the opposing portions, thus penetrating through the fabric edge. The thermoplastic material is then allowed to cool and solidify, thereby attaching the trim to the fabric edge. A preferred technique for locally heating the trim is to ultrasonically heat the trim with a sonic horn and anvil configured to contact the trim at the desired localized regions. The ultrasonically formed seams made in accordance with the present invention offer the potential for stronger seams than those made by conventional sewing in many cases, and the seams can be made faster than is typically the case with sewing. The seams also can be made soft and flexible so that they are as comfortable as or more comfortable than conventionally sewn seams.

The trim can be an elastic material. For instance, it is common to apply elastic banding around leg openings of garments such as briefs, panties, bodysuits, swimsuits, or the like, and elastic banding is also commonly attached about the waist of briefs and panties and along edges of brassieres and other types of garments. Such elastic banding often also serves a decorative function to provide a finished appearance along a fabric edge. Alternatively, the trim can be a decorative trim whose primary function is to provide a finished appearance along a fabric edge and to prevent raveling of the fabric, such as often applied around neck and/or arm openings of shirts and blouses. Such elastic and/or decorative trim can be attached without sewing in accordance with the present invention.

The localized regions at which the trim is heated and bonded can be intermittent and spaced along the length and/or along the width of the trim, or it can be a continuous line or lines extending along the trim. The localized regions can also form a decorative pattern. For example, the pattern of the localized regions can be designed to replicate the appearance of conventional stitching with thread, if desired.

Another aspect of the invention provides an alternative attachment of an elastic element along a fabric edge of a garment. In accordance with this embodiment of the invention, the fabric of the garment contains fibers of thermoplastic material, and the elastic element is laid on the fabric adjacent to the edge and the fabric is folded over the elastic element so that the elastic element is encased by the fabric and so that opposing portions of the fabric are in contact with each other. The opposing portions are then heated at localized regions thereof, such as by ultrasonic heating with a horn and anvil, to cause the thermoplastic material in the opposing portions to become plastic and flow together. The thermoplastic material is then allowed to cool and solidify, thereby bonding the fabric to itself and creating a tunneled elastic along the fabric edge. An advantage of this embodiment of the invention is that the elastic material need not be in a shape or comprise a material suitable for ultrasonic or other thermal bonding.

In yet another aspect of the invention, fabric portions of a garment can be joined together by ultrasonic bonding. In one embodiment, a panty comprises a fabric body having a front panel and a back panel. The fabric body contains fibers of thermoplastic material, and the front and back panels are ultrasonically bonded together in a crotch region of the panty. The panels can be joined with a lap joint, or they can be joined with a butt joint. An additional fabric panel can be provided in the crotch region for added material thickness, if desired. The additional fabric panel and the front and back panels can be joined together at a lap joint, which can be configured in various ways. Preferably, the front and back panels are ultrasonically bondable and the additional fabric panel is sandwiched at an end edge thereof between the front and back panels where they overlap each other. Side edges of the additional fabric panel can be sandwiched between the fabric of the panty and an ultrasonically bondable trim attached along the edge. Accordingly, the additional fabric panel need not, although it can, be ultrasonically bondable.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 12 is a cross-sectional view taken on line 12—12 through the gusset portion of the panty in FIG. 10.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
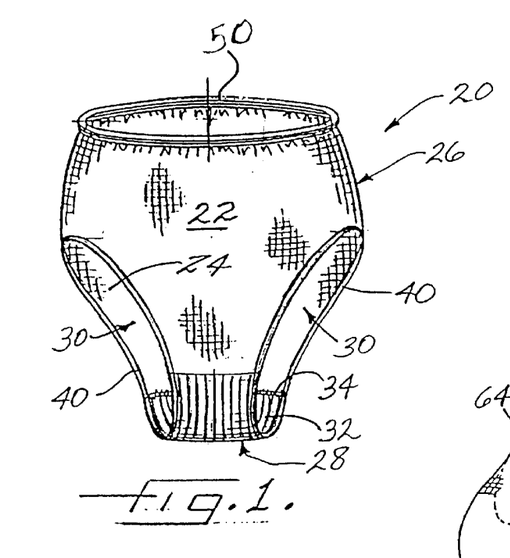
FIG. 1 is a perspective view of a panty in accordance with one preferred embodiment of the invention.

FIGS. 1, 2, 3, 7, and 10 show various types of garments, given by way of non-limiting example, to which the present invention can be applied. Although the illustrated examples relate to various items of women's apparel, it will be understood that the invention is in no way limited to women's apparel, but applies to a wide variety of both men's and women's garments. The invention is based on the principle of eliminating the process of sewing with thread to assemble and finish garments of various types. One aspect of the invention relates to the attachment of decorative and/or elastic trim or banding along edges of a garment. FIG. 1 depicts a panty 20 comprising a front panel 22 and a back panel 24 having opposite sides joined to or integrally knit with opposite sides of the front panel such that the front and back panels collectively form a generally tubular fabric body 26. Lower portions of the front and back panels are joined together in a suitable fashion so as to form a crotch or gusset portion 28 of the panty that extends between the wearer's legs and so as to form a pair of leg openings 30. The gusset portion 28 of the panty may comprise a gusset panel 32 having a knit construction differing from that of the rest of the fabric body 26, as shown, or alternatively the knit construction can be the same throughout the fabric body. In the illustrated embodiment, the gusset panel 32 is integrally knit with the front panel 22 and is joined to the back panel 24 along a joint or seam 34.

Attached along the edges of the front and back panels that encircle the leg openings 30 is a trim or banding 40, which can be a decorative and/or elastic textile material. In accordance with the first aspect of the invention, the trim 40 contains a sufficient quantity of thermoplastic fibers that the trim is thermally bondable to itself as well as to other textile materials likewise containing a sufficient quantity of thermoplastic fibers. More particularly, in accordance with preferred embodiments of the invention, the trim 40 is ultrasonically bondable to itself and to other ultrasonically bondable materials.

Figure 4:
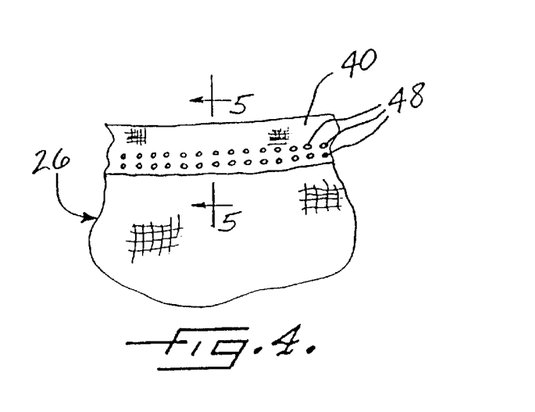
FIG. 4 is a fragmentary, magnified view of a portion of a fabric edge of a garment with a trim applied thereto.
Figure 5:
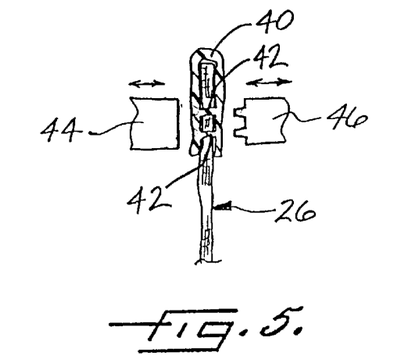
FIG. 5 is a cross-sectional view taken on line 5—5 of FIG. 4.

FIGS. 4 and 5 depict one embodiment of the invention with respect to attachment of the trim 40 to the edge of the fabric body 26 of a garment. The trim 40 advantageously comprises a strip of textile material that is wrapped over the edge of the fabric to which the trim is to be attached so that the edge of the fabric is sandwiched between opposing portions of the trim, as shown in FIG. 5. The trim 40 is then attached to the fabric edge by compressing the opposing portions of the trim and the fabric edge together between a pair of cooperating tools that heat localized regions of the trim so as to cause the thermoplastic fibers in the localized regions to become plastic and flowable. The flowable thermoplastic material from the opposing portions of the trim permeates through the fabric 26 and flows together so as to create continuous columns or filaments 42 of thermoplastic material that are joined to both of the opposing portions of the trim and penetrate through the fabric 26. The heating is then stopped so that the filaments 42 cool and solidify, thereby affixing the trim 40 to the fabric 26.

Preferably, the localized heating of the trim 40 is effected by ultrasonic techniques. Thus, as shown in FIG. 5, an ultrasonic horn 44 is positioned adjacent one side of the trim 40 and an anvil 46 is positioned adjacent the opposite side of the trim. In general, raised areas of the anvil surface will contact the trim and press the trim against the horn such that only areas of the trim contacted by the raised areas are heated and bonded, whereas depressed or recessed areas of the anvil surface will not press the trim against the horn and thus the areas of the trim corresponding to such recessed areas will not be heated and bonded. Accordingly, the anvil's surface can be configured in various ways to achieve various patterns of heated and bonded areas of the trim. The horn 44 and anvil 46 can be relatively movable toward each other to compress and ultrasonically heat the trim and fabric therebetween, and away from each other to allow the fabric to be moved or removed. For instance, the horn 44 and anvil 46 may have a relatively short length in comparison with the length of the fabric edge along which the trim 40 is to be attached; accordingly, the trim 40 may be ultrasonically attached to the fabric in a succession of discrete lengthwise increments of the trim, each increment being compressed and heated between the horn and anvil and then the fabric edge and/or the horn and anvil being moved to bring a succeeding increment of the trim and fabric edge between the horn and anvil for bonding. Alternatively, the horn and anvil can be set at a fixed distance from each other to form a sort of nip through which the fabric and trim can be moved on a continuous basis by a suitable drive mechanism, and the anvil 46 can be a rotating wheel. The wheel can be freewheeling so as to be frictionally driven by the fabric as the fabric moves through the nip, or the wheel can be rotatably driven so as to effect or assist in effecting the movement of the fabric through the nip. The outer surface of the anvil wheel can be patterned in any desired fashion to impart a desired pattern to the trim as it moves through the nip and is bonded by the horn and anvil. For example, the anvil wheel can be configured to bond the trim in a pattern resembling various types of stitching such as zigzag stitching, straight-line stitching, etc.

The horn 44 and anvil 46 can be configured such that the trim 40 is heated and bonded at a plurality of localized regions 48 that are spaced apart from one another as shown in FIG. 4. If desired, such localized regions 48 can be designed to replicate the appearance of stitching with thread. Thus, as shown in FIG. 4, the regions 48 replicate the appearance of a plurality of needle penetrations at uniform spacing along the trim, such as would be created by a conventional sewing operation. Alternatively, the localized regions at which ultrasonic bonding occurs can be designed to create any other desired type of pattern.

A significant advantage of the first aspect of the invention is that the fabric 26 to which the trim 40 is attached need not, although it can, contain thermoplastic fibers. For instance, the fabric 26 can be made up entirely or substantially of non-thermoplastic fibers such as cotton, wool, silk, rayon, or the like. This is possible because the mechanism responsible for bonding of the trim to the fabric and to itself is the permeation of the flowable thermoplastic material from the opposing portions of the trim through the fabric so as to create the columns or filaments 42 joining the opposing portions of the trim to each other. As such, the trim 40 preferably contains at least about 60 percent thermoplastic fibers by weight. Suitable thermoplastic fibers include but are not limited to polyamides (PA), such as nylon 6, nylon 6, 6, nylon 4, 6, nylon 8, nylon 6, 10, nylon 11, and nylon 12; polyolefins, such as polypropylene (PP), polyethylene (PE), polytetrafluoroethylene (PTFE), and polyphenylene ether (PPE or PPO); amorphous and/or crystalline polyesters; or polyimides.

The fabric 26, as noted above, can also contain thermoplastic fibers, although it need not do so. It may often be the case that the fabric 26 that is chosen for a particular garment contains thermoplastic fibers for reasons unrelated to the need to ultrasonically attach trim 40 to the garment. For instance, many fabrics commonly available in the marketplace comprise blends of natural and synthetic fibers, the selection of the natural and synthetic fibers and their relative percentages being chosen for reasons such as appearance, texture, elasticity, comfort, breathability, drape, shrinkage characteristics, durability, wrinkle-resistance, and other reasons. In many cases the synthetic component(s) of the fabric may comprise a thermoplastic material.

In the case of undergarments in particular, fabrics that tend to be favored generally comprise a relatively high percentage of cotton and a correspondingly low percentage of synthetic fibers, because such fabrics typically are more breathable and therefore more comfortable against the skin than fabrics having a high percentage of synthetic fibers. For instance, it is common in many garments, and in particular among undergarments, for the percentage of thermoplastic fibers in the fabric to be about 20 percent or less. Generally, the attachment of an ultrasonically bondable material to such a fabric would not be possible by ultrasonic bonding, because it is typically necessary for the components being ultrasonically bonded together to each comprise at least about 60 percent thermoplastic fibers. However, in accordance with the present invention, a trim 40 comprising at least about 60 percent thermoplastic fibers can be ultrasonically bonded to a fabric 26 even if the fabric contains 20 percent or less thermoplastic fibers. Indeed, the fabric can be entirely devoid of thermoplastic fibers when the technique of the present invention is employed.

Referring again to FIG. 1, the panty 20 includes a waistband 50. The waistband 50 can be formed in various ways. For instance, in the case of the fabric body 26 being knit on a circular knitting machine, the waistband 50 can comprise a turned welt integrally knit at one end of the fabric tube from which the fabric body 26 is cut. Alternatively, the waistband 50 can comprise a banding or trim that is ultrasonically bonded to the upper edge of the fabric body 26 in the manner described in connection with FIGS. 4 and 5 above.

Figure 6:
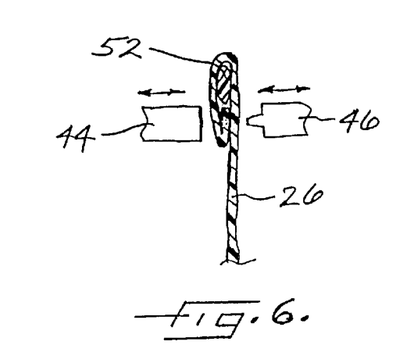
FIG. 6 is a cross-sectional view similar to FIG. 5, showing an alternative embodiment of the invention for attaching an elastic element to a garment.

Yet another alternative technique for forming the waistband 50 is to form a tunneled elastic as shown in FIG. 6. In accordance with this aspect of the invention, the fabric 26 comprises an ultrasonically bondable fabric as described above. An elastic element 52 such as an elastic cord or strip is placed against one side of the fabric 26 adjacent the edge thereof, and the edge of the fabric is folded over the elastic element 52 so as to encase the elastic element between opposing portions of the fabric. The opposing portions of the fabric are then ultrasonically bonded to each other by a suitable horn 44 and anvil 46. An advantage of this technique for forming a tunneled elastic is that the elastic element 52 need not, although it can, be an ultrasonically bondable material. The ultrasonic bond between the opposing portions of the fabric 26 can be located so as not to penetrate through the elastic element 52, if desired. The tunneled elastic construction can be employed as the waistband 50 for the panty 20, and/or can be employed for elasticizing the leg openings 30 of the panty.

Figure 2:
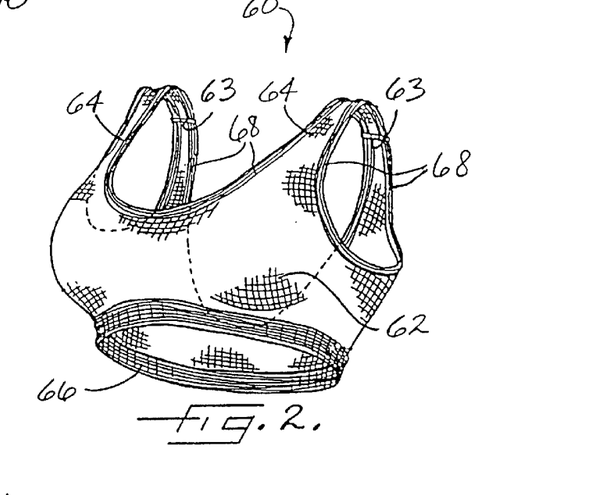
FIG. 2 is a perspective view of a brassiere in accordance with another preferred embodiment of the invention.

The above-described aspects of the invention are applicable to other types of garments beyond panties. For instance, FIG. 2 depicts a brassiere 60 to which the invention can be applied. The brassiere 60 comprises a generally tubular fabric body 62 for encircling the upper torso, and includes a pair of shoulder straps 64. The bottom edge of the brassiere can include a band 66 for providing a finished appearance to the edge and for preventing raveling of the fabric. A trim 68 is attached along the edges of the fabric in the region of the shoulder straps 64 and along the upper edge of the fabric body 62. Typically, the trim 68 is elastic, although the invention as applied to brassieres is not limited to elastic trims. The band 66 can also be an elastic trim, but again is not limited to elastic materials; furthermore, the band 66 can instead be a turned welt in the case of circular knitting of the fabric body 62. Any or all of the band 66 and trim 68 can be attached in the manner described above in connection with FIGS. 4 and 5. Alternatively, a tunneled elastic constructed in the manner described above in connection with FIG. 6 can be formed along the bottom edge of the brassiere 60 and/or at the edges of the shoulder straps and/or along the upper edge of the fabric body 62.

Figure 3:
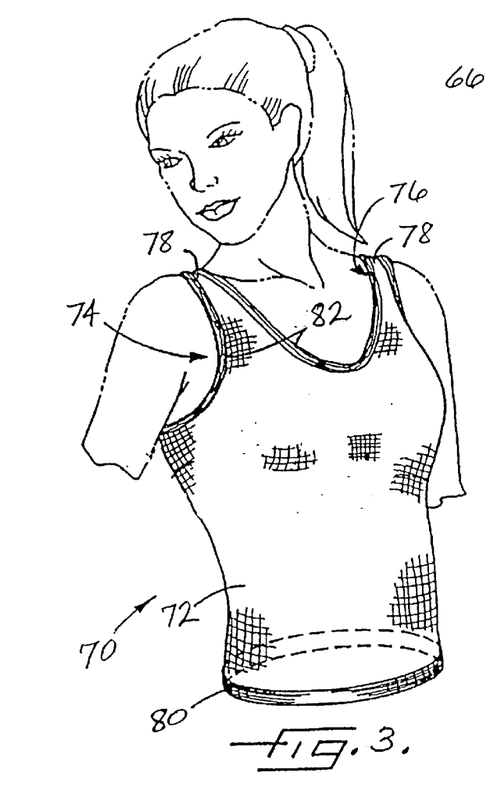
FIG. 3 is a perspective view of a shirt or blouse in accordance with a further embodiment of the invention.

FIG. 3 depicts a shirt or blouse 70 to which the invention can be applied. The blouse 70 comprises a generally tubular fabric body 72 for fitting over the torso, and includes arm openings 74 and a neck opening 76, and a pair of shoulder straps 78. The bottom edge of the blouse can include a band 80 for providing a finished appearance to the edge and for preventing raveling of the fabric. A decorative trim 82 is attached along the edges of the fabric encircling the arm openings 74 and the neck opening 76. Any or all of the band 80 and trim 82 can be attached in the manner described above in connection with FIGS. 4 and 5. Typically, the band 80 and trim 82 are non-elastic, although the invention as applied to shirts or blouses is not limited to non-elastic bands and trims. Moreover, a tunneled elastic constructed in the manner described above in connection with FIG. 6 can be formed along the bottom edge of the blouse 70 and/or about the arm and/or neck openings of the blouse.

Figure 7:
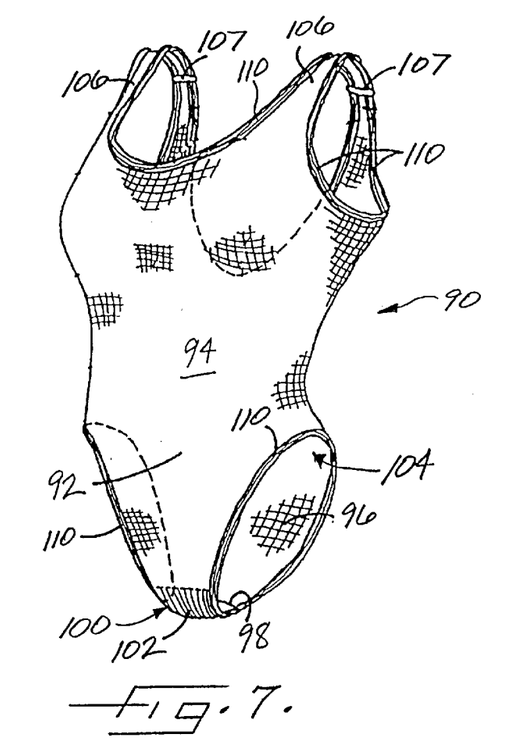
FIG. 7 is a perspective view of a bodysuit or one-piece swimsuit in accordance with the present invention.

FIG. 7 depicts a bodysuit or swimsuit 90 to which the invention can be applied. The suit 90 comprises a generally tubular fabric body 92 having a front panel 94 that covers the front of the upper and lower torso, and a back panel 96 that covers the back of at least the lower torso and optionally the upper torso also, depending on the style of the suit. Lower portions of the front and back panels 94 and 96 are joined together along a seam 98 to form a gusset 100 that extends between the legs. The gusset can include a gusset panel 102 having a knit construction differing from that of the other parts of the suit. The gusset panel 102 in the illustrated embodiment is integrally knit with the front panel 94. The suit defines a pair of leg openings 104 and includes a pair of shoulder straps 106. A banding or trim 110 is attached along the edges of the fabric body encircling the leg openings and along the edges of the shoulder straps and the upper edge of the fabric body. The trim 110 can be an ultrasonically bondable material attached in the manner described above in connection with FIGS. 4 and 5. Alternatively, a tunneled elastic construction as shown in FIG. 6 can be formed along any or all of the edges of the suit 90.

Figure 8:
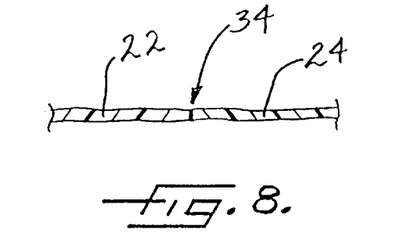
FIG. 8 is a cross-sectional view through a butt joint between two fabric panels in accordance with the present invention.
Figure 9:
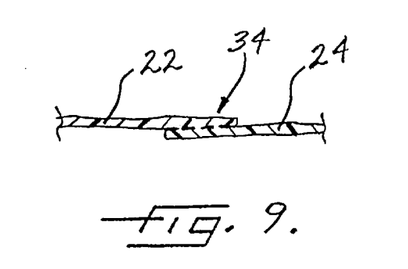
FIG. 9 is a cross-sectional view through a lap joint between two fabric panels in accordance with the present invention.

A further aspect of the invention is depicted in FIGS. 8, 9, and 12. In the garments 20, 60, 70, and 90 described above in connection with FIGS. 1, 2, 3, and 7, respectively, there are fabric panels that must be joined together to create the finished garment. Thus, in the panty 20 of FIG. 1, even though the fabric body 26 may be circularly knit as a one-piece tubular construction, the front panel 22 and back panel 24 must be attached together along at least one seam or joint 34 in order to create the finished panty. Likewise, for the brassiere 60 of FIG. 2, even though the fabric body 62 may be circularly knit as a one-piece tubular construction, formation of the shoulder straps requires joining a front panel and a back panel of each strap along at least one seam or joint 63 therebetween. The shoulder straps of the blouse 70 of FIG. 3 and the shoulder straps of the bodysuit 90 of FIG. 7 similarly require the formation of seams or joints 107 (FIG. 7), and the bodysuit 90 further requires at least one seam or joint 98 in the gusset region of the garment. Any or all of these seams or joints can be made by ultrasonic bonding in accordance with the present invention.

As an illustrative example, FIGS. 8 and 9 show two alternative joint constructions between the front panel 22 and the back panel 24 of the panty of FIG. 1. In FIG. 8, the joint 34 between these panels comprises a butt joint, while the joint in FIG. 9 is a lap joint. In each case, both panels 22 and 24 must be ultrasonically bondable fabrics, i.e., containing at least about 60 percent thermoplastic fibers by weight. For example, the fabric may be a blend of about 60 percent nylon and 40 percent cotton. The joint 34 is effected by placing the surfaces of the fabric panels 22 and 24 that are to be bonded together in contact with each other, and engaging the adjoining surfaces of the panels between an ultrasonic horn and anvil to locally heat and bond the panels at the joint.

Figure 13:
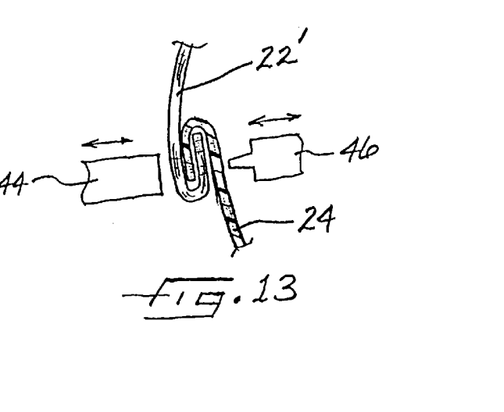
FIG. 13 is a cross-sectional view through a joint between an ultrasonically bondable fabric panel and a non-ultrasonically bondable fabric panel in accordance with the present invention.

FIG. 13 shows an alternative embodiment of a joint 34' in accordance with the invention. The joint 34' has the advantage that one of the fabric panels need not, although it can, be ultrasonically bondable. Thus, the fabric panel 22' is shown as being a non-thermoplastic fabric, while the fabric panel 24 is a fabric that is ultrasonically bondable, i.e., preferably containing at least about 60 percent thermoplastic fibers. The joint 34' is made by sandwiching an edge of the non-ultrasonically bondable panel 22' between opposing portions of the ultrasonically bondable panel 24 by folding the edge of the panel 24 over the edge of the panel 22', thus creating a lap joint. The lap joint is then ultrasonically bonded so that the thermoplastic material in the panel 24 permeates through the fabric panel 22' in a manner similar to that described above in connection with FIG. 5, thus attaching the panel 22' to the panel 24. Advantageously, the panel 22' can comprise substantially or entirely non-thermoplastic fibers such as cotton or other natural fibers. The invention thus enables ultrasonic bonding to be employed even though one of the panels being joined is not an ultrasonically bondable material.

Figure 10:
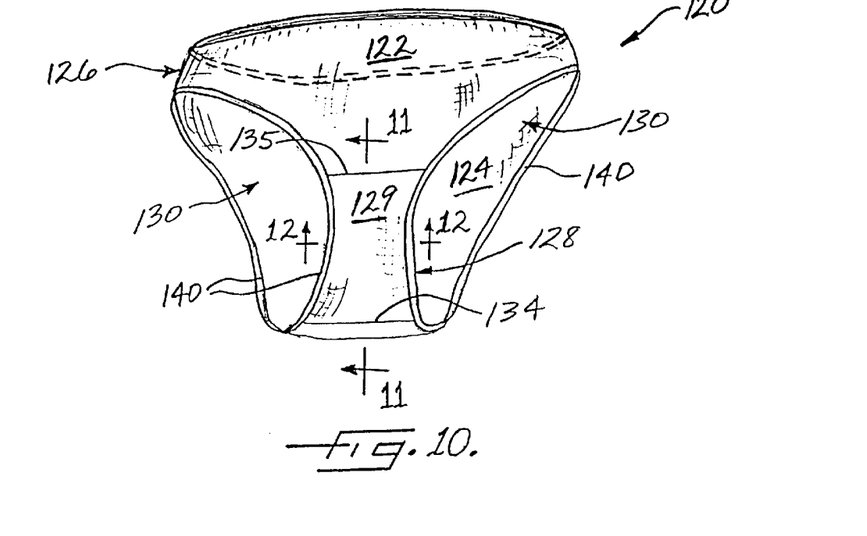
FIG. 10 is a perspective view of a panty in accordance with yet another embodiment of the invention, shown in an inside-out orientation.
Figure 11:
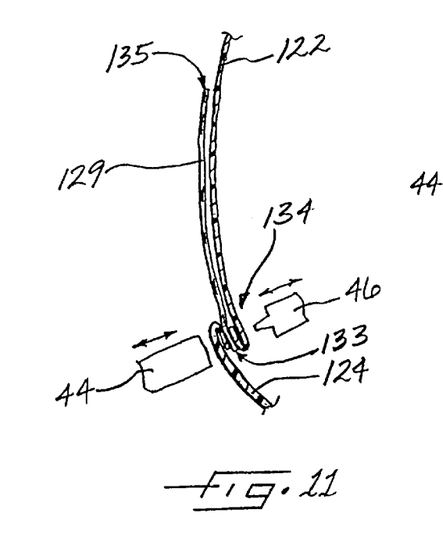
FIG. 11 is a cross-sectional view taken on line 11—11 through the gusset portion of the panty in FIG. 10.

FIGS. 10 and 11 illustrate an application of this technique to the creation of a panty 120, shown in an inside-out orientation. The panty 120 comprises a front panel 122 and a back panel 124 joined or integrally knit together to form a generally tubular fabric body 126. Lower portions of the front and back panels are joined together in a suitable fashion so as to form a crotch or gusset portion 128 of the panty that extends between the wearer's legs and so as to form a pair of leg openings 130. The gusset portion 128 also includes an additional fabric panel or liner 129 that lines the inner surface of the gusset portion and thus is against the wearer's body. One end edge 133 of the liner 129 is joined with lower edges of the front panel 122 and back panel 124 at a joint 134. The opposite end edge 135 of the liner 129 preferably is left unattached to the front panel 122 except at the side edges thereof, as further described below.

The joint 134 is shown in detail in FIG. 11. The joint is made by sandwiching the edge 133 of the liner 129 between overlapping edges of the front and back panels 122 and 124, and locally heating the joint with an ultrasonic horn 44 and anvil 46 such that thermoplastic material from the overlapping edges of the front and back panels permeates through the edge of the liner 129, and then cools and solidifies to join all three panels together. An advantage of the joint 134 is that the liner 129 need not, although it can, comprise an ultrasonically bondable fabric. For example, the liner 129 can be an all-cotton panel for absorbency and breathability against the wearer's body.

As shown on the left-hand side of FIG. 12, the liner 129 can be attached to the panel 122 of the panty by sandwiching edges of the liner 129 and the panel 122 between opposing portions of an ultrasonically bondable trim 140 folded over the edges of the liner and panel and bonded thereto in the manner described above in connection with FIGS. 4 and 5. Alternatively, as shown on the right-hand side of FIG. 12, the edge of the panel 122 can be folded over the edge of the liner 129 such that each side edge of the liner 129 is sandwiched between opposing portions of the panel 122, and the opposing portions can be ultrasonically bonded to each other and the liner. In this case, the trim 140 is not needed for joining the liner to the garment, although it can be included, if desired. An elastic element (not shown) can also be disposed between the opposing portions of the panel 122 to form a tunneled elastic construction as described above in connection with FIG. 6, if desired.

Clearly, although not illustrated in the drawings, the construction of the gusset 128 described above can also be applied to garments other than panties, including but not limited to bodysuits, swimsuits, and the like. Moreover, the general principle of attaching a liner to a garment by sandwiching the edges of the liner between folded-over opposing portions of an ultrasonically bondable component of the garment and then ultrasonically bonding the opposing portions to each other and to the liner, can be applied to many types of garments having liners, including but not limited to panties, brassieres, blouses, bodysuits, swimsuits, skirts, dresses, and others. It will also be recognized, of course, that instead of sandwiching the edges of the liner between opposing portions of the component of the garment, the component of the garment could be sandwiched between opposing portions of the liner and ultrasonically bonded thereto, provided the liner is an ultrasonically bondable fabric, in which case the component of the garment need not be ultrasonically bondable.

The invention thus provides garments and methods allowing many if not all of the conventional sewing operations performed in the assembly and finishing of garments to be replaced by thermal bonding operations. Preferably, ultrasonic bonding is employed because of the high speed at which the joints can be made. The ultrasonic bonding process also lends itself to a greater degree of control over the heating process so that desired characteristics of the joint can be obtained. In this regard, preferably the dwell time and frequency of the ultrasonic energy applied to the joint are selected so as to obtain a "soft" joint that is comfortable when against the wearer. The particular dwell time and frequency for achieving such a soft joint depend largely on the type of fabric materials being joined, and thus no general rule of thumb can be given for selecting these variables.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A garment, comprising:
    a fabric body formed of yarns, the fabric body having a fabric edge; and
    an elongate trim attached to the fabric body along the fabric edge, the trim being formed of a textile material including fibers of thermoplastic material, the trim being attached to the fabric edge by wrapping the trim over the fabric edge such that the fabric edge is sandwiched between opposing portions of the trim and passing the trim and the fabric edge lengthwise through a nip defined between an ultrasonic horn and a rotating anvil, the anvil having an outer periphery configured to cause the trim to be heated at localized regions thereof spaced apart along a length of the trim, said heating the thermoplastic fibers at localized spaced apart regions to melt and penetrate the fabric edge, such that upon cooling and re-solidification of the thermoplastic material the trim is attached to the fabric edge at said localized spaced apart regions;
    wherein the fabric body is a non-ultrasonically bondable fabric, and the trim is attached to the fabric edge by thermoplastic material penetrating the fabric edge from each of the opposing portions of the trim such that the opposing portions are attached to each other through the non-ultrasonically bondable fabric.

2. The garment of claim 1, wherein the fabric body comprises a knitted fabric.

3. The garment of claim 1, wherein the fabric body comprises a circularly knit fabric.

4. The garment of claim 1, wherein the fabric body is a resiliently stretchable fabric and the trim is an elastic material.

5. The garment of claim 1, wherein the localized regions at which the trim is attached to the fabric body are configured to simulate the appearance of a plurality of needle penetrations spaced along the trim such that the trim appears to have been sewn on the garment.

6. The garment of claim 1, wherein the trim encircles an opening defined by the fabric body.

7. The garment claim 1, wherein the garment is a substantially seamless garment, the fabric body being knit, on a circular knitting machine as a tubular fabric.

8. A substantially seamless garment, comprising:
    a fabric body formed from a circularly knit tubular fabric, the fabric body defining at least one body opening encircled by a fabric edge, the fabric body having a synthetic fiber content less than about 60 percent;
    an ultrasonically bondable elastic trim attached along the fabric edge so as to encircle the at least one body opening, the trim comprising a textile material including fibers formed of thermoplastic material, the trim being attached to the fabric edge by wrapping the trim over the fabric edge such that the fabric edge is sandwiched between opposing portions of the trim and passing the trim and the fabric edge lengthwise through a nip defined between an ultrasonic horn and a rotating anvil, said heating the thermoplastic fibers at localized spaced-apart regions to soften and penetrate the fabric edge, the opposing portions of the trim are attached to each other through the fabric edge at said localized spaced-apart regions upon cooling a re-solidification of the thermoplastic material.

* * * * *

UNITED STATES PATENT AND TRADEMARK OFFICE
CERTIFICATE OF CORRECTION

PATENT NO. : 6,622,312 B2
DATED : September 23, 2003
INVENTOR(S) : Rabinowicz

It is certified that error appears in the above-identified patent and that said Letters Patent is hereby corrected as shown below:

<u>Title page, Item [54] and Column 1, line 1,</u>
Title, "GARMENT" should read -- GARMENTS --.

<u>Column 1,</u>
Line 8, "09/679,159" should read -- 09/679,157 --.

<u>Column 10,</u>
Lines 2-4, cancel "the anvil having an outer periphery configured to cause the trim to be heated at localized regions thereof spaced apart along a length of the trim, said";
Line 31, after "knit" cancel the comma ",";
Line 47, before "heating" cancel "said";
Line 51, "a" should read -- and --.

Signed and Sealed this

Twentieth Day of January, 2004

JON W. DUDAS
*Acting Director of the United States Patent and Trademark Office*